(12) United States Patent
Xiao et al.

(10) Patent No.: US 10,046,310 B2
(45) Date of Patent: Aug. 14, 2018

(54) CATALYTIC CONVERTERS WITH AGE-SUPPRESSING CATALYSTS

(71) Applicant: GM GLOBAL TECHNOLOGY OPERATIONS LLC, Detroit, MI (US)

(72) Inventors: Xingcheng Xiao, Troy, MI (US); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/247,653

(22) Filed: Aug. 25, 2016

(65) Prior Publication Data

US 2017/0095795 A1    Apr. 6, 2017

Related U.S. Application Data

(60) Provisional application No. 62/237,418, filed on Oct. 5, 2015.

(51) Int. Cl.
*B01J 21/04* (2006.01)
*B01J 21/06* (2006.01)
(Continued)

(52) U.S. Cl.
CPC ............ *B01J 23/40* (2013.01); *B01D 53/944* (2013.01); *B01D 53/945* (2013.01); *B01J 35/0006* (2013.01); *B01J 35/026* (2013.01); *B01J 35/04* (2013.01); *B01J 35/10* (2013.01); *B01J 37/0018* (2013.01); *B01J 37/0228* (2013.01);
(Continued)

(58) Field of Classification Search
CPC . B01J 21/04; B01J 21/06; B01J 21/063; B01J 21/066; B01J 21/08; B01J 21/10; B01J 21/12; B01J 21/14; B01J 23/40; B01J 23/42; B01J 23/44; B01J 23/46; B01J 23/58; B01J 23/60; B01J 23/63; B01J 35/0006; B01J 35/026; B01J 35/04;
(Continued)

(56) References Cited

U.S. PATENT DOCUMENTS 5,494,701 A * 2/1996 Clough ............... C03C 25/1095
427/126.3
5,603,983 A * 2/1997 Clough ............. C04B 35/62847
427/126.3
(Continued)

FOREIGN PATENT DOCUMENTS

CN    103974759    8/2014
CN    106560594 A   4/2017
(Continued)

OTHER PUBLICATIONS

U.S. Appl. No. 62/109,130, filed Jan. 29, 2015, Shouxian Ren et al.
(Continued)

*Primary Examiner* — Cam N. Nguyen
(74) *Attorney, Agent, or Firm* — Harness, Dickey & Pierce, P.L.C.

(57) ABSTRACT

A catalytic converter includes a catalyst. The catalyst includes a supporting oxide layer. The catalyst also includes platinum group metal (PGM) particles partially embedded in the supporting oxide layer such that a portion of each PGM particle is surrounded by the supporting oxide layer and an other portion of each PGM particle remains exposed.

20 Claims, 3 Drawing Sheets

(51) Int. Cl.

| | | |
|---|---|---|
| *B01J 21/08* | (2006.01) | |
| *B01J 21/10* | (2006.01) | |
| *B01J 21/12* | (2006.01) | |
| *B01J 21/14* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |
| *B01J 23/58* | (2006.01) | |
| *B01J 23/60* | (2006.01) | |
| *B01J 23/63* | (2006.01) | |
| *B01J 35/00* | (2006.01) | |
| *B01J 35/02* | (2006.01) | |
| *B01J 35/04* | (2006.01) | |
| *B01J 37/00* | (2006.01) | |
| *B01J 37/02* | (2006.01) | |
| *B01J 37/08* | (2006.01) | |
| *B01J 37/34* | (2006.01) | |
| *B01D 53/94* | (2006.01) | |
| *F01N 3/10* | (2006.01) | |
| *F01N 3/28* | (2006.01) | |
| *B01J 35/10* | (2006.01) | |

(52) U.S. Cl.
CPC ............ *B01J 37/08* (2013.01); *F01N 3/101* (2013.01); *F01N 3/103* (2013.01); *F01N 3/2828* (2013.01); *B01D 2255/102* (2013.01); *B01D 2255/702* (2013.01); *B01D 2255/9022* (2013.01); *B01D 2255/91* (2013.01); *B01D 2255/9202* (2013.01); *B01J 37/024* (2013.01); *B01J 37/0238* (2013.01); *B01J 37/349* (2013.01); *F01N 2330/06* (2013.01); *F01N 2370/02* (2013.01); *Y02T 10/22* (2013.01)

(58) Field of Classification Search
CPC .. B01J 37/0018; B01J 37/0228; B01J 37/024; B01J 37/08; B01J 37/349
See application file for complete search history.

(56) References Cited

U.S. PATENT DOCUMENTS

| | | | |
|---|---|---|---|
| 5,633,081 A * | 5/1997 | Clough | ................... C03C 17/27 428/331 |
| 5,756,207 A * | 5/1998 | Clough | ............. C04B 35/62847 428/375 |
| 6,022,825 A | 2/2000 | Anderson et al. | |
| 7,323,432 B2 | 1/2008 | Niihara et al. | |
| 7,964,167 B2 | 6/2011 | Kim et al. | |
| 8,057,767 B1 | 11/2011 | Qi et al. | |
| 8,211,392 B2 | 7/2012 | Grubert et al. | |
| 8,226,915 B2 | 7/2012 | Qi et al. | |
| 8,268,274 B2 | 9/2012 | Kim et al. | |
| 8,309,489 B2 * | 11/2012 | Roldan Cuenya | ..... B01D 53/88 502/182 |
| 8,318,119 B2 | 11/2012 | Qi et al. | |
| 8,343,888 B2 | 1/2013 | Kim et al. | |
| 8,349,761 B2 | 1/2013 | Xia et al. | |
| 8,377,400 B2 | 2/2013 | Schmieg et al. | |
| 8,466,083 B2 | 6/2013 | Schmieg et al. | |
| 8,513,158 B2 * | 8/2013 | Roldan Cuenya | ..... B01D 53/88 502/240 |
| 8,535,632 B2 * | 9/2013 | Chase | ................ B01D 53/8678 422/139 |
| 8,539,760 B2 | 9/2013 | Li et al. | |
| 8,545,779 B2 | 10/2013 | Blint et al. | |
| 8,852,689 B2 * | 10/2014 | Srinivas | ................. A01N 25/34 427/191 |
| 8,959,894 B2 | 2/2015 | Qi et al. | |
| 8,992,869 B2 | 3/2015 | Ratts et al. | |
| 9,186,654 B2 | 11/2015 | Qi et al. | |
| 9,597,635 B2 | 3/2017 | Qi et al. | |
| 2002/0082163 A1 | 6/2002 | Yan et al. | |
| 2009/0041645 A1 | 2/2009 | Wassermann et al. | |
| 2010/0086832 A1 | 4/2010 | Lopez et al. | |
| 2010/0204518 A1 | 8/2010 | Wolf et al. | |
| 2010/0229533 A1 | 9/2010 | Li et al. | |
| 2010/0233045 A1 | 9/2010 | Kim et al. | |
| 2011/0223096 A1 | 9/2011 | Wolf et al. | |
| 2012/0036834 A1 | 2/2012 | Qi et al. | |
| 2012/0042631 A1 | 2/2012 | Schmieg et al. | |
| 2012/0047874 A1 | 3/2012 | Schmieg et al. | |
| 2012/0159927 A1 | 6/2012 | Li et al. | |
| 2012/0159935 A1 | 6/2012 | Li et al. | |
| 2013/0034472 A1 | 2/2013 | Cantrell et al. | |
| 2013/0294989 A1 | 11/2013 | Koch et al. | |
| 2013/0294990 A1 | 11/2013 | Koch et al. | |
| 2014/0041905 A1 * | 2/2014 | Srinivas | ................. A01N 25/34 174/251 |
| 2014/0057781 A1 | 2/2014 | Stamm Masias et al. | |
| 2015/0231566 A1 | 8/2015 | Xu et al. | |
| 2015/0266014 A1 | 9/2015 | Xue et al. | |
| 2015/0361913 A1 | 12/2015 | Qi, I et al. | |
| 2016/0123945 A1 | 5/2016 | Qi et al. | |
| 2016/0149230 A1 * | 5/2016 | Debe | ......................... B01J 23/42 502/4 |
| 2017/0095807 A1 * | 4/2017 | Xiao | .................... B01D 53/944 |

FOREIGN PATENT DOCUMENTS

| | | |
|---|---|---|
| DE | 102016218366 A1 | 4/2017 |
| EP | 0695580 | 3/2003 |
| GB | 2522978 | 8/2015 |
| JP | 2006192357 | 7/2006 |
| JP | 2009247968 | 10/2009 |
| JP | 2011230104 | 11/2011 |
| JP | 05747952 | 7/2015 |
| JP | 05806536 | 11/2015 |
| KR | 2011001004 | 1/2011 |
| KR | 1092606 | 12/2011 |
| WO | WO2007063615 | 6/2007 |
| WO | WO2013182302 | 12/2013 |

OTHER PUBLICATIONS

Chen, et al; "Development of low temperature three-way catalysts for future fuel effecient vehicles"; Johnson Matthey Technol. Rev.; 2015; vol. 59; (1); pp. 64-67.

Chang, et al.; "Gasoline cold start concept (gCSC) technology for low temperature emission control"; SAE Int. J. Fuels Labr. 7(2); 2014 pp. 480-488.

Dai, et al.; "A sinter-resistant Catalytic system based on platinum nanoparticles supported on TiO2 nanofibers and covered by porous silica"; Angew. Chen-Lint. Ed.; 2010; vol. 49 pp. 8165-8168.

Lu, et al.; "Coking- and sintering-resistant palladium catalysts achieved through atomic layer deposition" Science; 2012; vol. 335; No. 6073; pp. 1205-1208 Abstract Only.

Pan, et al. "Effect of alumina on structure and acidity of solid acid catalyst Pt-SO_4~(2-)/ZrO_2-Al_20_3"; Chinese Journal of Catalysis; 2005; Abstract Only Wang; "Fabrication and testing of low-temperature catalytically active washcoat materials for next-generation vehicle catalytic converters"; YSU-CTME; 2013; pp. 1-9.

Li, et al.; "A sintering-resistant Pd/Si02 catalyst by reverse-loading nano iron oxide for aerobic oxidation of benzyl alcohol"; RSC Advances; 2015; vol. 5; pp. 4766-4769; Abstract Only.

Lu, et al.; "A sinter-resistant catalytic system fabricated by maneuvering the selectivity of SiO2 deposition onto the Tio2 surface versus the pt nanoparticle surface"; Nano Lett.; 2013; vol. 13 (10); pp. 4957-4962; Abstract Only.

\* cited by examiner

CATALYTIC CONVERTERS WITH AGE-SUPPRESSING CATALYSTS

CROSS-REFERENCE TO RELATED APPLICATIONS

This application claims the benefit of U.S. Provisional Application Ser. No. 62/237,418, filed Oct. 5, 2015, which is incorporated by reference herein in its entirety.

TECHNICAL FIELD

The present disclosure relates generally to catalytic converters, and more specifically to age-suppressing catalysts.

BACKGROUND

Vehicles with an Internal Combustion Engine (ICE) include an exhaust gas treatment system for treating the exhaust gas from the engine. The configuration of the treatment system depends, in part, upon whether the engine is a diesel engine (which typically operates with lean burn combustion and contains high concentrations of oxygen in the exhaust gases at all operating conditions) or a stoichiometric spark-ignited engine (which operates at a nearly stoichiometric air-to-fuel (A/F) ratio). The treatment system for the diesel engine includes a diesel oxidation catalyst (DOC), which is capable of oxidizing carbon monoxide (CO) and hydrocarbons (HC). The treatment system for the stoichiometric spark-ignited engine includes a three-way catalyst (TWC), which operates on the principle of non-selective catalytic reduction of $NO_x$ by CO and HC.

SUMMARY

A catalytic converter includes a catalyst. The catalyst includes a supporting oxide layer. The catalyst also includes platinum group metal (PGM) particles partially embedded in the supporting oxide layer such that a portion of each PGM particle is surrounded by the supporting oxide layer and another portion of each PGM particle remains exposed. Some examples of the catalyst also include a gap that separates the supporting oxide layer from the portion of each PGM particle that is surrounded by the supporting oxide layer.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
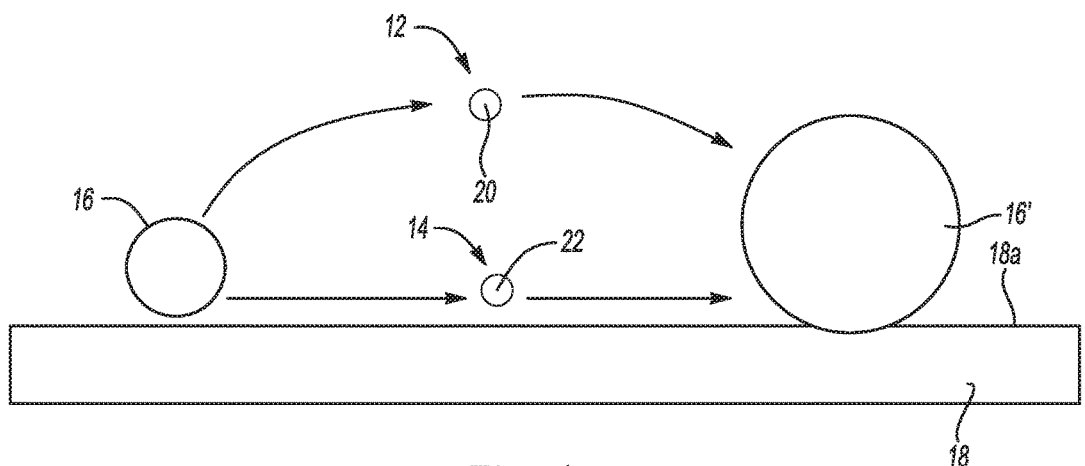
FIG. 1 is a schematic illustration depicting two mechanisms for PGM particle growth or sintering.

DOCs and TWCs often include a support loaded with a Platinum Group Metal (PGM) as the active catalytic/catalyst material. As the exhaust gas temperature from the vehicle engine increases (e.g., to temperatures ranging from 150° C. to about 1000° C.), the PGM loaded on the support may experience particle growth (i.e., sintering). FIG. 1 depicts two mechanisms for PGM particle growth during vehicle operation. The mechanisms involve atomic and/or crystallite PGM migration. The first mechanism involves PGM migration via a vapor phase, denoted 12, and the second mechanism involves PGM migration via surface diffusion, denoted 14. In the first mechanism, a mobile species (not shown), emitted from the PGM particles 16 loaded on the support 18, can travel through the vapor phase 12 and agglomerate with other metal particles 20 in the vapor phase 12 to form larger PGM particles 16'. In the second mechanism, a mobile species (not shown) emitted from the PGM particles 16 can diffuse along the surface 18a of the support 18 and agglomerate with other metal particles 22 on the surface 18a to form larger PGM particles 16'.

An increase in the size of the PGM particles 16' results in poor PGM utilization and undesirable aging of the catalyst material. More specifically, the increased particle size reduces the PGM dispersion, which is a ratio of the number of surface PGM atoms in the catalyst to the total number of PGM atoms in the catalyst. A reduced PGM dispersion is directly related to a decrease in the active metal surface area (as a result of particle growth), and thus indicates a loss in active catalyst reaction sites. The loss in active catalyst reaction sites leads to poor PGM utilization efficiency, and indicates that the catalyst has undesirably been aged or deactivated.

It has been observed that about 1% of the PGM in a typical TWC remains catalytically active after 100,000 to 150,000 miles of driving (i.e., 99% of the PGM is wasted). One approach to counteract the effect of sintering is to use a high enough PGM loading to compensate for the catalyst deactivation. However, this increases the cost of the TWC.

The catalysts disclosed herein suppress aging by physically separating the PGM particles 16 with a modified support (referred to herein as the supporting oxide layer 24, shown in FIGS. 2B, 2C, 3C, and 3D). The supporting oxide layer 24 partially embeds the particles 16 so that a portion of each particle 16 is surrounded by the supporting oxide layer 24 and so that another portion of each particle 16 remains exposed (for subsequent exposure to and interaction with exhaust gases). In some examples, the portion of the particles 16 that is surrounded by the supporting oxide layer 24 is also anchored to the supporting oxide layer 24. In other examples, the portion of the particles 16 that is surrounded by the supporting oxide layer 24 is not attached to the supporting oxide layer 24 but is retained within the supporting oxide layer 24. In any of the examples, the particles 16 are substantially immobilized within the supporting oxide layer 24 and are prohibited from undergoing surface diffusion 14 (i.e., from agglomerating and sintering).

As mentioned above, the PGM particles 16 can vaporize at high temperatures (e.g., when exposed to exhaust gas). Some of the examples disclosed herein include a gap between the portion of each particle 16 and the surrounding supporting oxide layer 24. This gap exposes the maximum surface area of the particle 16 for contact with exhaust gases. This gap also exposes an interior surface of the supporting oxide layer 24, and thus provides a physical barrier which can capture PGM vapors (by the condensation of PGM vapor on the inner surface/wall). The mobile species in the captured vapors agglomerate to form new PGM nanoparticles within the gap. The newly formed PGM nanoparticles may be smaller than the PGM particles 16, and may provide additional active PGM sites for catalysis.

The configurations of the catalyst disclosed herein slow down or prevent the PGM particle growth/sintering and maintain more active PGM sites over time, and thus the catalyst ages slower than catalysts without the supporting oxide layer. Moreover, when sintering is reduced or prevented, the operational temperature of the catalyst is prevented from drifting upward over time.

Two approaches have been developed to form examples of the catalysts disclosed herein. One approach is shown in FIGS. 2A through 2C, and another approach is shown in FIGS. 3A through 3D.

Figure 2A:
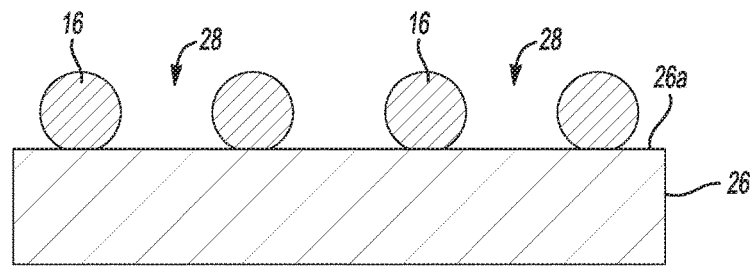
FIGS. 2A through 2C are schematic, cross-sectional views which together illustrate one example of a method for forming an example of a catalyst disclosed herein.
Figure 2B:
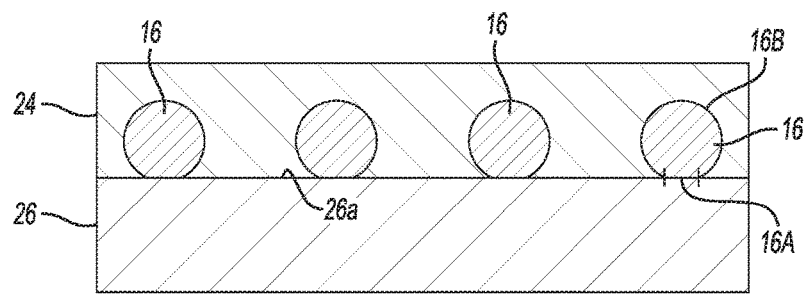
Figure 2C:
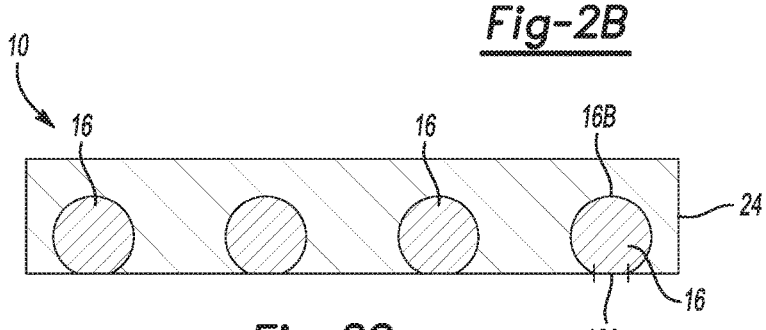

In the example shown in FIGS. 2A through 2C, the portion 16B (see FIGS. 2B and 2C) of the particles 16 that is surrounded by the supporting oxide layer 24 is also anchored to the supporting oxide layer 24.

This example method begins with a sacrificial layer 26. The sacrificial layer 26 may be made up of a material that is easily removed without deleteriously affecting the particles 16 or the supporting oxide layer 24 that may be in contact with the sacrificial layer 26. Examples of the sacrificial layer 26 include a high surface area carbon, graphite, graphene, graphene nanoplatelets, a carbon-based polymer, and carbon black. Examples of the carbon-based polymer include polypropylene (PP), polyethylene (PE), polyethylene terephthalate (PET), poly(methyl methacrylate) (PMMA), poly(3,4-ethylenedioxythiophene) polystyrene sulfonate (PEDOT:PSS), polypyrrole (PPy), poly(p-phenylene vinylene) (PPV or polyphenylene vinylene), and polyethylene oxide (PEO or polyoxyethylene (POE).

The sacrificial layer 26 provides a surface upon which the catalyst 10 is formed, and thus may have any suitable configuration that fulfills this purpose. The sacrificial layer 26 may be any shape, as long as the PGM particles 16 can be removably attached to the surface 26a and the distance between adjacent particles 16 is greater than or equal to the average diameter of the particles 16. In an example, the sacrificial layer 26 has a substantially flat surface and has a thickness that is sufficient to support the PGM particles 16 deposited thereon. As an example, the thickness of the sacrificial layer 26 may range from about 1 nanometer (nm) to about 3 microns (μm).

As shown in FIG. 2A, a plurality of PGM particles 16 is deposited on a surface 26a of the sacrificial layer 26. The PGM particles 16 are formed of active catalytic material, and may be palladium (Pd), platinum (Pt), rhodium (Rh), ruthenium (Ru), osmium (Os), iridium (Ir), or various combinations thereof (e.g., Pd and Pt, Pt and Rh, Pd and Rh, Pd, Pt and Rh, Pt and Ir, Pd and Os, or any other combination), or other precious metals used in catalytic converters. The PGM particles 16 are present in the catalyst 10 in an amount ranging from about 0.1 wt % to about 10 wt % of the catalyst 10.

While each particle 16 is illustrated as being a single PGM particle 16, it is to be understood that the particles 16 may each be made up of several PGM particles 16 agglomerated together. For example, each of the particles 16 shown in FIG. 2A may include a small cluster of the particles 16, with the particles 16 being similarly sized or having a distribution in particle size. For another example, each of the particles shown in FIG. 2A may include an individual particle 16 that is isolated from each other individual particle 16 by a space 28. The distance of the space 28 may be at least the average diameter of the particles 16.

The plurality of PGM particles 16 may be deposited on a surface 26a of the sacrificial layer 26 by a precipitation method, chemical vapor deposition (CVD), physical vapor deposition (PVD), atomic layer deposition (ALD), or molecular layer deposition (MLD). When CVD or PVD is used to form the PGM particles 16, the deposition time may be relatively short. When these techniques are performed for longer deposition times, continuous films may form. As such, the time of the deposition may be controlled to ensure the formation of PGM particles having nano- or micro-sized dimensions (e.g., from about 1 nm to about 3 μm). Furthermore, it is to be understood that ALD and MLD need OH (hydroxyl) functional groups (at the surface 26a) or oxygen (e.g., from $O_2$ plasma) to react.

The precipitation method utilizes a PGM solution. The PGM solution may be an aqueous solution that includes a PGM precursor dissolved or dispersed in water. Examples of other suitable PGM solutions include a platinum nitrate solution, a platinum(II) chloride solution, a platinum acetate solution, a palladium nitrate solution, a palladium acetate solution, a rhodium nitrate solution, a rhodium acetate solution, or combinations thereof. PGM precursors of ruthenium, osmium, and/or iridium may also be used. The sacrificial layer 26 will be immersed or mixed with the PGM solution, and then dried in air. The PGM particles 16 will precipitate on the surface 26a of the sacrificial layer 26.

Platinum nanoparticles (~1 nm in diameter) may be made using (trimethyl)methylcyclopentadienyl platinum(IV) as a precursor in the CVD process. In this example, the sacrificial layer 26 is placed in a reaction chamber into which the vaporized precursor (mixed with a carrier gas, such as $O_2$) is introduced. The precursor diffuses or is carried to and absorbs onto the surface of the sacrificial layer 26, where it decomposes to form the platinum PGM nanoparticles.

Examples of other precursors that are suitable for forming PGM particles via CVD, ALD, or MLD include platinum(II) acetylacetonate, platinum(II) hexafluoroacetylacetonate, (trimethyl)cyclopentadienyl platinum(IV), (trimethyl)pentamethylcyclopentadienyl platinum(IV), tris(dibenzylideneacetone) platinum(0), allyl(cyclopentadienyl)palladium (II), Bis(2,2,6,6-tetramethyl-3,5-heptanedionato) palladium (II), palladium(II) hexafluoroacetylacetonate, Bis (cyclopentadienyl) ruthenium(II), Bis (ethylcyclopentadienyl) ruthenium(II), Bis (pentamethylcyclopentadienyl) ruthenium(II), triruthenium dodecacarbonyl, and combinations thereof.

As shown in FIG. 2B, a supporting oxide layer 24 is deposited on the PGM particles 16 and on the sacrificial layer 26. Since a portion 16A of each of the PGM particles 16 is in contact with the sacrificial layer 26, this portion 16A will not be in contact with the supporting oxide layer 24. Another portion 16B of each of the PGM particles 16 is, in this example, in direct contact with the supporting oxide layer 24. As depicted in FIG. 2B, the supporting oxide layer 24 is also formed directly on the exposed surface 26a of the sacrificial layer 26.

The supporting oxide layer 24 may be any of the metal oxide (e.g., ceramic) material commonly used in catalytic converters. Examples of suitable metal oxides include $Al_2O_3$, $CeO_2$, $ZrO_2$, $CeO_2$—$ZrO_2$, $SiO_2$, $TiO_2$, MgO, ZnO, BaO, $K_2O$, $Na_2O$, CaO, and combinations thereof.

The supporting oxide layer 24 may be formed via any suitable method that will conformally deposit the metal oxide on the portion 16B of the PGM particles 16 and on the exposed surface 26a of the sacrificial layer 26. Examples of suitable deposition methods include wet chemistry, chemical vapor deposition (CVD), physical vapor deposition (PVD), atomic layer deposition (ALD), or molecular layer deposition (MLD). As noted above, ALD and MLD need, in some instances, OH (hydroxyl) functional groups to react, and thus these techniques may be used when the surfaces of the PGM particles 16 and the sacrificial layer 26 contain OH groups.

Since the supporting oxide layer 24 is to partially embed the particles 16 (e.g., surround the portion 16B), the supporting oxide layer 24 that is formed should conformally coat the particles 16 and be at least as thick as the PGM particles 16, which have a thickness/diameter ranging from about 3 nm to about 5 nm, or as little as 1 nm and up to a few microns (e.g., 3 μm).

As shown in FIG. 2C, the sacrificial layer 26 is removed to form the catalyst 10. The removal of the sacrificial layer 26 may be performed mechanically (e.g., by grinding), or chemically (e.g., by exposure to a chemical etchant), or using a plasma, or by heating. The removal process used is selective toward the sacrificial layer 26 (i.e., will not deleteriously affect the PGM particles 16 or the supporting oxide layer 24), and thus will depend upon the materials used. In an example of chemical removal, perchloric acid may be used to remove an oxide sacrificial layer, such as ZnO, CuO, etc., but will not deleteriously affect the supporting oxide layer 24 (e.g., $Al_2O_3$). In an example in which a plasma is used, the sacrificial layer 26 may be etch way by exposure to an oxidant plasma, such as O plasma. In still another example when the sacrificial layer 26 is carbon, heating to a temperature above 200° C. in air or oxygen converts the carbon into $CO_2$. In other examples, heating may be above 400° C.

As a result of the selective removal of the sacrificial layer 26, the portion 16A of each PGM particle 16 is exposed. In this example catalyst 10, "exposed" means that the supporting oxide layer 24 is not in contact with and does not surround the portion 16A. The portion 16A is not covered, and thus can be contacted by exhaust gases that can react therewith.

In the catalyst 10 shown in FIG. 2C, the portion 16B of the PGM particles 16 is in direct contact with and is surrounded by the supporting oxide layer 24, while the portion 16A of the PGM particles 16 is exposed. The particles 16 are anchored/attached to the supporting oxide layer 24, and thus are not able to migrate when exposed to high temperatures.

Referring now to FIGS. 3A through 3D, another example of the method for forming another example of the catalyst 10' is depicted. In this example, the portion 16B of the particles 16 that is surrounded by the supporting oxide layer 24 is not attached to the supporting oxide layer 24 but is retained within the supporting oxide layer 24.

Figure 3A:
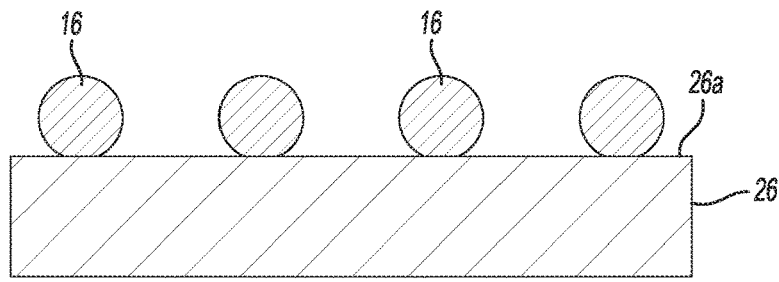
FIGS. 3A through 3D are schematic, cross-sectional views which together illustrate another example of a method for forming another example of a catalyst disclosed herein.

This example method also begins with the sacrificial layer 26 and the PGM particles 26 deposited on the sacrificial layer 26, as shown in FIG. 3A. The previously described materials for the sacrificial layer 26 and the PGM particles 16 may be used in this example. Moreover, the PGM particles 26 may be deposited using any of the methods previously described.

Figure 3B:
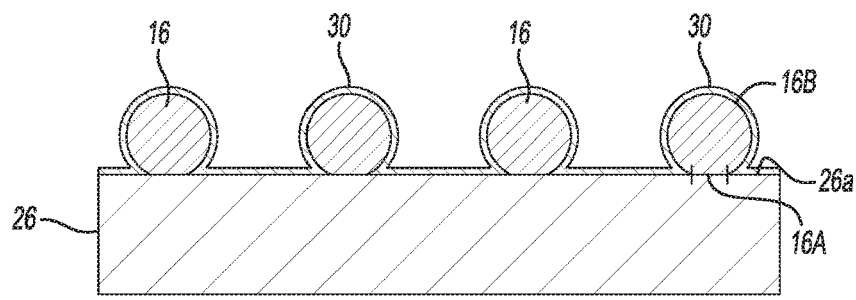

As shown in FIG. 3B, another sacrificial layer 30 (also referred to herein as a second sacrificial layer) is deposited on the PGM particles 16 and on the sacrificial layer 26. Since the portion 16A of each of the PGM particles 16 is in contact with the sacrificial layer 26, this portion 16A will not be in contact with the sacrificial layer 30. However, the portion 16B of each of the PGM particles 16 is, in this example, in direct contact with the other/second sacrificial layer 30. As depicted in FIG. 3B, the other/second sacrificial layer 30 is also formed directly on the exposed surface 26a of the sacrificial layer 26.

The other/second sacrificial layer 30 may be made up of a material that is easily removed without deleteriously affecting the particles 16 or the supporting oxide layer 24 that may be in contact with the sacrificial layer 30. Examples of the other/second sacrificial layer 30 include a high surface area carbon, graphite, carbon black, and any of the carbon-based polymers described herein for the sacrificial layer 26. Other materials that may be used for the other/second sacrificial layer 30 include polymers, such as polyacrylonitrile (PAN).

The other/second sacrificial layer 30 may be formed via any suitable method that will conformally deposit the sacrificial layer 30 on the portion 16B of the PGM particles 16 and on the exposed surface 26a of the sacrificial layer 26. Examples of suitable deposition methods include wet chemistry, chemical vapor deposition (CVD), physical vapor deposition (PVD), atomic layer deposition (ALD), or molecular layer deposition (MLD). When the PGM particles 16 and the sacrificial layer 26 have surface OH groups, ALD or MLD may be used.

Figure 3C:
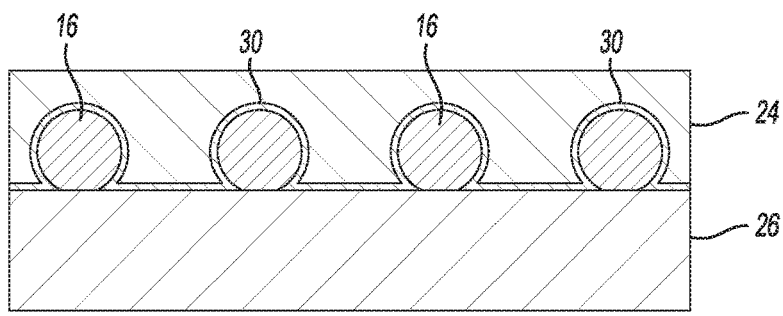
Figure 3D:
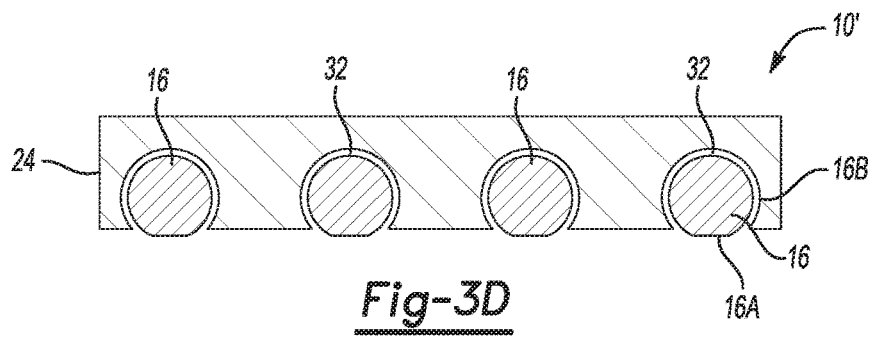

The other/second sacrificial layer 30 will form a gap 32 between the portion 16B of the PGM particles 16 and the supporting oxide layer 24, as shown in FIG. 3D. As such, the thickness of the other/second sacrificial layer 30 should be large enough to create a space into which exhaust gas can flow and small enough that the particles 16 are retained by the surrounding supporting oxide layer 24. The thickness of the other/second sacrificial layer 30 is less than half of the diameter of the PGM particles 16. In an example, the thickness of the other/second sacrificial layer 30 ranges from 1/10 of 1/2 of the particle diameter.

As shown in FIG. 3C, the supporting oxide layer 24 is deposited on the other/second sacrificial layer 30, and thus is also on (but not in direct contact with) the PGM particles 16 and the sacrificial layer 26. The previously described materials for the supporting oxide layer 24 may be used in this example. Moreover, the supporting oxide layer 24 may be deposited using the methods previously described. However, if ALD or MLD is to be used, the surface of the other/second sacrificial layer 30 must contain OH groups.

Since the supporting oxide layer 24 is to partially embed the particles 16 (e.g., surround the portion 16B and the gap 32 adjacent thereto), the supporting oxide layer 24 that is formed should conformally coat the particles 16 and be at least as thick as the PGM particles 16.

As shown in FIG. 3d, the sacrificial layer 26 and the other/second sacrificial layer 30 are removed to form the catalyst 10', which includes the gap 32 between the supporting oxide layer 24 and the particles 16. The removal of the sacrificial layer 26 and the other/second sacrificial layer 30 may be performed simultaneously or sequentially. The selective removal technique used will depend upon the material of each of the sacrificial layer 26 and the other/second sacrificial layer 30. Any of the selective removal techniques previously described may be used.

As a result of the selective removal of the sacrificial layer 26 and the other/second sacrificial layer 30, the portion 16A of each PGM particle 16 is exposed and the gap 32 is created. In this example catalyst 10', the exposed portion 16A is not in contact with or surrounded by the supporting oxide layer 24, and the exposed portion 16B is not in contact with (because of the gap 32) but is surrounded by the supporting oxide layer 24. The supporting oxide layer 24 retains the particles 16 within the gap 32 (thus preventing migration), while the gap 32 increases the surface area of the particles 16 to which exhaust gas can be exposed (thus improving catalysis).

In comparing the two approaches shown in FIGS. 2A-2C and 3A-3D, it is seen that the second approach takes one additional step and can expose maximum PGM particle 16 surface area while still immobilizing the PGM particles 16.

Figure 4A:
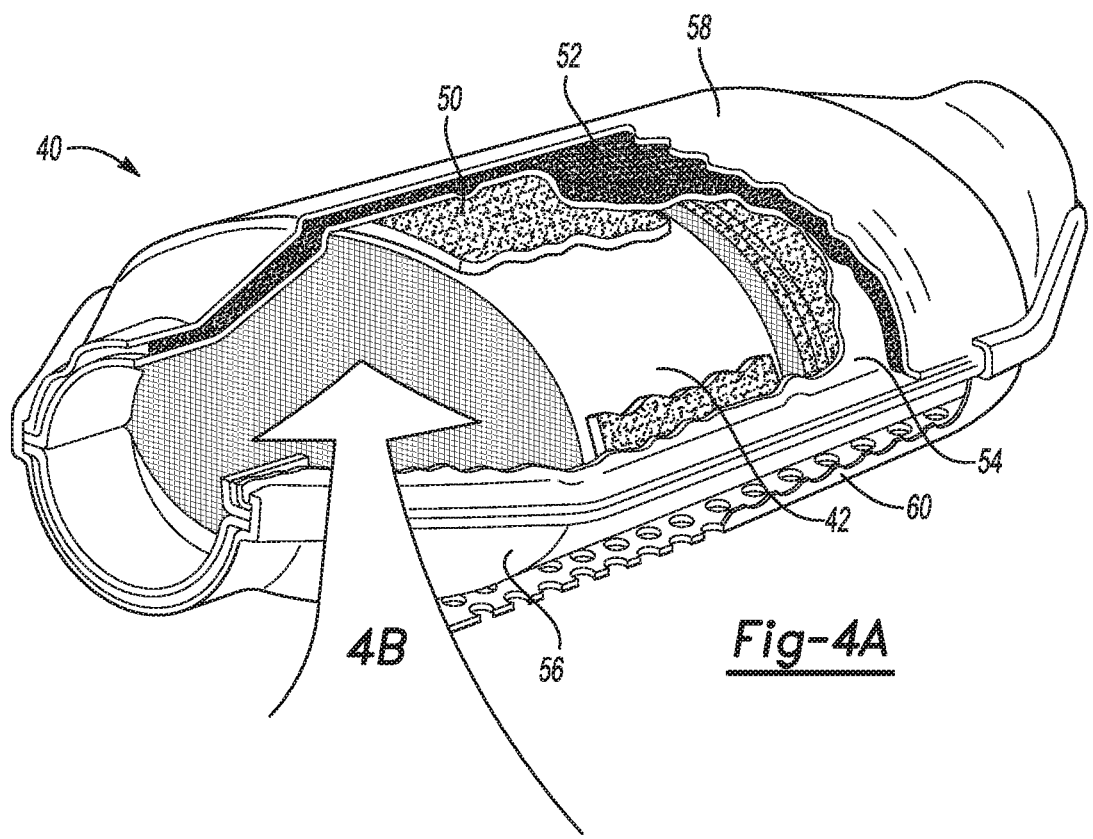
FIG. 4A is a perspective, partially cut-away view of an example of a catalytic converter.

The method(s) disclosed herein may be used to suppress aging of the PGM particles 16 in a catalytic converter. For example, the catalyst 10, 10' is formed as previously described, and then the catalyst 10, 10' is incorporated into the catalytic converter. For incorporation into the catalytic converter, the catalyst 10, 10' may be applied to a monolith substrate and utilized in the catalytic converter. An example of the catalytic converter is shown in FIG. 4A and an example of the monolith substrate is shown in both FIGS. 4A and 4B.

The catalytic converter 40 includes the monolith substrate 42. The monolith substrate 42 may be formed of a ceramic or a metal alloy that is capable of withstanding high temperatures (e.g., 100° C. or higher). Synthetic cordierite is a magnesium-alumino-silicate ceramic material that is suitable for use as the monolith substrate 42. A ferritic iron-chromium-aluminum alloy is an example of a metal alloy that is suitable for use as the monolith substrate 42. The monolith substrate 42 has a honeycomb or other three-dimensional structure.

Figure 4B:
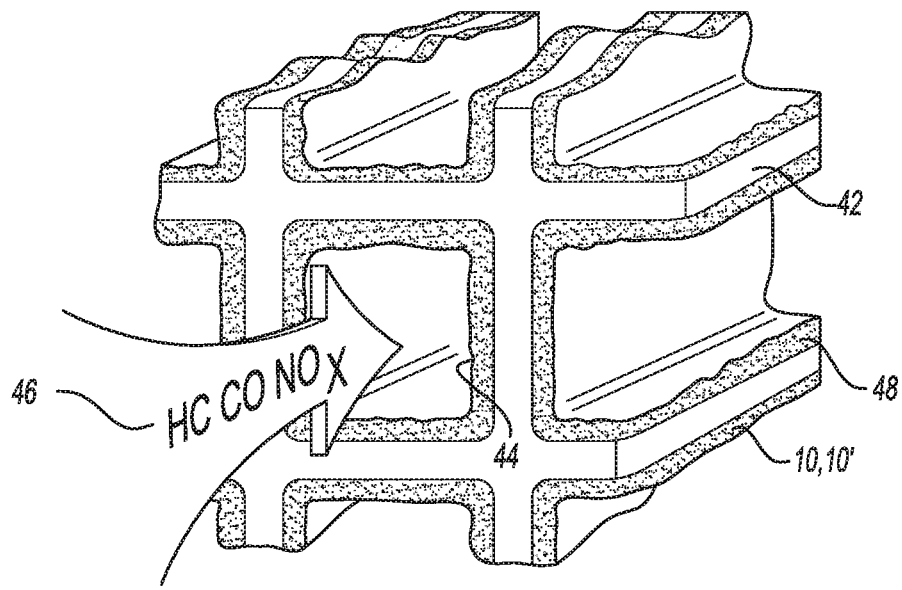
FIG. 4B is an enlarged view of a portion of FIG. 4A.

An enlarged view of a portion of the monolith substrate 42 is depicted in FIG. 4B. The monolith substrate 42 includes a large number of parallel flow channels 44 to allow for sufficient contact area between the exhaust gas 46 and the catalyst 10, 10' (contained in coating 48) without creating excess pressure losses.

The coating 48 includes the catalyst 10, 10' disclosed herein. In some instances, the coating 48 may also include a binder material (e.g., sol binders or the like). The coating 48 may be applied to the monolith substrate 42 by washcoating or some other similar processes.

Referring back to FIG. 4A, in the catalytic converter 40, the monolith substrate 42 (with the coating 48 thereon) is surrounded by a mat 50, which in turn is surrounded by insulation 52. Upper and lower shells 54, 56 (formed of metal) may be positioned between the mat 50 and the insulation 52. An insulation cover 58 may be positioned over the upper shell 54 and the insulation 52 thereon, and a shield 60 may be positioned adjacent to the lower shell 56 and the insulation 52 thereon.

The catalytic converter 40 may be a DOC, which is used in a diesel engine. The DOC is a two way catalytic converter, which eliminates hydrocarbons and CO by oxidizing them, respectively, to water and $CO_2$. The DOC may also exhibit $NO_x$ storage capability during the vehicle cold-start period. In such diesel engines, the reduction of $NO_x$ to water and $N_2$ may take place in a separate unit, and may involve the injection of urea into the exhaust.

The catalytic converter 40 may also be a TWC, which is used in a stoichiometric spark-ignited engine. The TWC is a three way catalytic converter, which reduces NOx to $N_2$, and oxidizes HC and CO, respectively, to water and $CO_2$.

It is to be understood that the ranges provided herein include the stated range and any value or sub-range within the stated range. For example, a range of from about 3 nm to about 5 nm should be interpreted to include not only the explicitly recited limits of from about 3 nm to about 5 nm, but also to include individual values, such as 3.2 nm, 4 nm, etc., and sub-ranges, such as from about 3.5 nm to about 4.6 nm, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A method of suppressing aging of platinum group metal (PGM) particles in a catalytic converter, the method comprising:
   depositing the PGM particles on a first surface of a sacrificial layer, wherein the sacrificial layer is selected from the group consisting of a high surface area carbon, graphite, graphene, graphene nanoplatelets, carbon-based polymers, and carbon black;
   depositing a supporting oxide layer on exposed surfaces of the PGM particles and on exposed surfaces of the first surface of the sacrificial layer, thereby surrounding a portion of each of the PGM particles with the supporting oxide layer to partially embed the PGM particles within the supporting oxide layer; and
   removing the sacrificial layer, thereby exposing a portion of each of the PGM particles, wherein the partially embedded PGM particles are substantially immobilized within the supporting oxide layer preventing PGM particle growth or sintering and accelerated aging of the PGM particles.

2. The method as defined in claim 1 wherein the supporting oxide layer is in direct contact with the portion of each of the PGM particles embedded therein.

3. The method as defined in claim 2, further comprising exposing the catalytic converter to exhaust gas, wherein the portion of each of the PGM particles exposed after removing the sacrificial layer is contacted by and capable of reacting with the exhaust gas.

4. The method as defined in claim 1 wherein the supporting oxide layer is selected from the group consisting of $Al_2O_3$, $CeO_2$, $ZrO_2$, $CeO_2$—$ZrO_2$, $SiO_2$, $TiO_2$, MgO, ZnO, BaO, $K_2O$, $Na_2O$, CaO, and combinations thereof.

5. The method as defined in claim 1 wherein:
   the sacrificial layer is a first sacrificial layer and prior to depositing the supporting oxide layer on the exposed surfaces of the PGM particles and on the exposed surfaces of the first surface of the first sacrificial layer, the method further comprises depositing a second sacrificial layer on the exposed surfaces of the PGM particles and the exposed surfaces of the first surface of the first sacrificial layer;
   the deposited supporting oxide layer is in direct contact with the second sacrificial layer; and
   the method further comprises removing the second sacrificial layer, thereby creating a gap between the supporting oxide layer and the PGM particles partially embedded in the supporting oxide layer.

6. The method as defined in claim 5, further comprising exposing the catalytic converter to exhaust gas, wherein the entire surface of each of the PGM particles is contacted by and capable of reacting with the exhaust gas.

7. The method as defined in claim 5 wherein the second sacrificial layer is selected from the group consisting of a high surface area carbon, graphite, carbon black, carbon-based polymers, and polyacrylonitrile.

8. The method as defined in claim 5 wherein the second sacrificial layer is selected from the group consisting of a high surface area carbon, graphite, graphene, graphene nanoplatelets, carbon-based polymers, and carbon black.

9. The method as defined in claim 5 wherein the removing of the second sacrificial layer is accomplished by mechanical etching, chemical etching, plasma etching, or heating.

10. The method as defined in claim 5 wherein the removing of the first sacrificial layer and the removing of the second sacrificial layers occurs at the same time.

11. The method as defined in claim 1 wherein the depositing of the PGM particles on the sacrificial layer is accomplished by a precipitation method, chemical vapor deposition, physical vapor deposition, atomic layer deposition, or molecular layer deposition.

12. The method as defined in claim 1 wherein the depositing of the supporting oxide layer on the exposed surfaces of the PGM particles and on the exposed surfaces of the first surface of the sacrificial layer is accomplished by wet chemistry, chemical vapor deposition (CVD), physical vapor deposition (PVD), atomic layer deposition (ALD), or molecular layer deposition (MLD).

13. The method as defined in claim 1 wherein the removing of the sacrificial layer is accomplished by mechanical etching, chemical etching, plasma etching, or heating.

14. The method as defined in claim 1 wherein the carbon-based polymer is selected from the group consisting of polypropylene (PP), polyethylene (PE), polyethylene terephthalate (PET), poly(methyl methacrylate) (PMMA), poly(3,4-ethylenedioxythiophene) polystyrene sulfonate, polypyrrole (PPy), poly(p-phenylene vinylene) (PPV), and polyethylene oxide (PEO).

15. A method of suppressing aging of platinum group metal (PGM) particles in a catalytic converter, the method comprising:
depositing the PGM particles on a first surface of a first sacrificial layer;
depositing a second sacrificial layer on exposed surfaces of the PGM particles and exposed surfaces of the first surface of the first sacrificial layer;
depositing a supporting oxide layer on exposed surfaces of the PGM particles and on exposed surfaces of the second sacrificial layer, thereby surrounding a portion of each of the PGM particles with the supporting oxide layer to partially embed the PGM particles within the supporting oxide layer;
removing the first sacrificial layer, thereby exposing a portion of each of the PGM particles; and
removing the second sacrificial layer, thereby creating a gap between the supporting oxide layer and the PGM particles partially embedded in the supporting oxide layer, wherein the partially embedded PGM particles are substantially immobilized within the supporting oxide layer preventing PGM particle growth or sintering and accelerated aging of the PGM particles.

16. The method as defined in claim 15 wherein the first sacrificial layer is selected from the group consisting of a high surface area carbon, graphite, graphene, graphene nanoplatelets, carbon-based polymers, and carbon black.

17. The method as defined in claim 15 wherein the second sacrificial layer is selected from the group consisting of a high surface area carbon, graphite, carbon black, carbon-based polymers, and polyacrylonitrile.

18. The method as defined in claim 15 wherein the supporting oxide layer is selected from the group consisting of $Al_2O_3$, $CeO_2$, $ZrO_2$, $CeO_2$—$ZrO_2$, $SiO_2$, $TiO_2$, MgO, ZnO, BaO, $K_2O$, $Na_2O$, CaO, and combinations thereof.

19. The method as defined in claim 15 further comprising exposing the catalytic converter to exhaust gas, wherein entire surface of each of the PGM particles is contacted by and capable of reacting with the exhaust gas.

20. The method as defined in claim 15 wherein the removing of the first sacrificial layer and the removing of the second sacrificial layers occurs concurrently.

* * * * *